United States Patent
Korpela et al.

(10) Patent No.: US 6,751,460 B2
(45) Date of Patent: Jun. 15, 2004

(54) METHODS AND APPARATUS FOR PERFORMING CELL RESELECTION FOR SUPPORTING EFFICIENTLY HIERARCHICAL CELL STRUCTURES

(75) Inventors: Sari Korpela, Kauniainen (FI); Kaj Jansen, Salo (FI)

(73) Assignee: Nokia Corporation, Espoo (FI)

( * ) Notice: Subject to any disclaimer, the term of this patent is extended or adjusted under 35 U.S.C. 154(b) by 728 days.

(21) Appl. No.: 09/730,350

(22) Filed: Dec. 5, 2000

(65) Prior Publication Data

US 2001/0031638 A1 Oct. 18, 2001

Related U.S. Application Data

(60) Provisional application No. 60/169,477, filed on Dec. 7, 1999.

(51) Int. Cl.$^7$ ................................................ H04Q 7/20
(52) U.S. Cl. ........................ 455/449; 455/434; 455/436; 455/444; 455/446; 455/443
(58) Field of Search ................................ 455/449, 434, 455/436, 443, 444, 524, 525, 446

(56) References Cited

U.S. PATENT DOCUMENTS

| | | | | |
|---|---|---|---|---|
| 5,640,677 A | | 6/1997 | Karlsson | 455/33.2 |
| 5,701,586 A | * | 12/1997 | Tabbane et al. | 455/422.1 |
| 5,768,267 A | * | 6/1998 | Raith et al. | 370/329 |
| 2001/0011019 A1 | * | 8/2001 | Jokimies | 455/449 |
| 2001/0055966 A1 | * | 12/2001 | Hanly | 455/422 |
| 2002/0068581 A1 | * | 6/2002 | Salonaho | 455/456 |

FOREIGN PATENT DOCUMENTS

WO    WO 99/03290    * 1/1999

OTHER PUBLICATIONS

3GPP TSG–RAN WG2 Meeting #9, Document R2–99i06, Sophia Antipolis, France, Nov. 29—Dec. 3, 1999.

(List continued on next page.)

Primary Examiner—William Trost
Assistant Examiner—Danh C Le
(74) Attorney, Agent, or Firm—Harrington & Smith, LLP

(57) ABSTRACT

A method for performing a cell reselection in a system comprised of a hierarchy of cells, wherein cells of one layer of the hierarchy have a size that differs from cells of another layer of the hierarchy. The method includes steps of (a) identifying to a user equipment a layer to which individual cells in a neighbor cell list are associated; (b) when performing neighbor cell measurements for reselection purposes, avoiding a measurement of cells in the list that are larger than a current serving cell unless a Cell Selection (S) parameter falls below a search threshold parameter (Ssearch), and is greater than zero; and (c), if S is less than or equal to zero, and no cell reselection to a better cell is in process, beginning a measurement of neighbor cells without regard for their hierarchical level. If the user equipment has made cell reselection to N different cells on the same hierarchical layer within a time Tmax, the user equipment initiates a reselection procedure for larger neighbor cells. This procedure accommodates user equipment that is moving at a relatively high speed through the cells. If the user equipment locates a larger cell, which fulfills cell reselection criteria Sn>0 and Qn>Qs+Qoffset$_{s,n}$+Qhyst for a period of time Treselection, cell reselection to the larger cell is made. Furthermore, if the user equipment performs a cell reselection to the larger cell, the user equipment does not attempt to reselect to a smaller cell within a time X, unless an immediate cell evaluation is triggered, wherein the time X can be pre-specified, or can be set by the network.

12 Claims, 2 Drawing Sheets

OTHER PUBLICATIONS

3GPP TSG–RAN WG2 Meeting #9, Document R2–99i07, Sophia Antipolis, France, Nov. 29—Dec. 3, 1999. "3$^{rd}$ Generation Partnership Project; Technical Specification Group Radio Access Network; UE Procedures in Idle Mode" (3G TS 25.304 version 3.0.0) pps. 5–36.

ETSI: "Universal mobile Telecommunications System (UMTS); UE Procedures in Idle Mode and Procedures for Cell Reselection in Connected Mode (3GPP TS 25.304 version 3.4.0. Release 1999)" ETSI TS 125 304 v3.4.0, Sep. 2000, pp. 1–43.

* cited by examiner

METHODS AND APPARATUS FOR PERFORMING CELL RESELECTION FOR SUPPORTING EFFICIENTLY HIERARCHICAL CELL STRUCTURES

CLAIM OF PRIORITY FROM A COPENDING PROVISIONAL PATENT APPLICATION

This Patent Application claims priority under 35 U.S.C. §119(e) from copending Provisional Patent Application 60/169,477, filed on Dec. 7, 1999, entitled "METHODS AND APPARATUS FOR PERFORMING CELL RESELECTION FOR SUPPORTING EFFICIENTLY HIERARCHICAL CELL STRUCTURES, by Sari Korpela and Kaj Jansen. The disclosure of this Provisional Patent Application is incorporated by reference herein in its entirety.

FIELD OF THE INVENTION

This invention relates generally to radio telephone systems and, more particularly, to cellular communication systems wherein user equipment (UE) operates within cells, and has a capability to perform cell selection and reselection operations.

BACKGROUND OF THE INVENTION

In a cellular communication system a plurality of base stations or base sites are provided, each of which has a surrounding coverage area (cell) within which mobile stations, such as cellular telephones, personal communicators, packet data terminals and the like can operate. These various devices can be collectively referred to as user equipment (UE). When the UE is capable of motion relative to the cells, then it can travel from cell to cell. This requires cell-to-cell handover procedures. One aspect of handover is that the UE will normally have a capability to perform surrounding (neighbor) cell signal measurement, measurement reporting and, importantly, selection/reselection operations. An important goal is to ensure that the UE is always operating with a cell capable of servicing the communication needs of the UE.

One modern cellular communication system that is under development is known as the 3rd Generation Partnership Project (3GPP). It is desirable that the system specifications for the 3GPP system provide flexibility while, from the UE implementation point, a not too demanding cell reselection procedure. Inter-frequency measurements for cell reselection should be performed in such a way that it can be ensured that the UE can still correctly receive paging messages, without compromising the battery life, and hence the talk time and standby time, of the UE.

Currently, the 3GPP WG2 technical specification, TS25.304 V.3.0.0 (1999-10), does not define how the UE should measure and make cell reselection to other frequencies (cells on different layers or on different frequencies but on the same layer) efficiently from both the UE and the UMTS (Universal Mobile Telecommunications System) Terrestrial Radio Access Network (or UTRAN) point of view. This specification does set some priorities for measurements and cell reselection, but these priorities are not optimal in all respects.

The 3GPP WG2 technical specification, TS25.304 V.3.0.0 (1999-10) is incorporated by reference herein in its entirety.

In brief, the purpose of cell reselection is to regularly look for the best cell for the UE to camp on, and a current serving cell is changed when a better one is found. The criterion for a better cell is different for intra/inter-frequency and inter-radio access system reselections.

The following steps are carried out when evaluating cells for cell reselection:

(A) The candidate list of potential cells to camp on includes the cells for intra/inter-frequency and intra-radio access system reselections in system information of the serving cell.
(B) Calculate a Quality (Q) value for each cell and a Cell Selection (S) value for each current UMTS Terrestrial Radio Access (UTRA) mode cell in the candidate list.
(C) Depending on which type of cells are on the candidate list (intra-frequency, inter-frequency and inter-radio access system), select the cell that best fulfills the corresponding criteria.

Better cells are prioritized in the following order when several cells fulfil their corresponding criteria:

(1) Intra-frequency neighboring cells
(2) Inter-frequency neighboring cells
(3) Inter-radio access system neighboring cells The criteria for a better intra-frequency cell are found in Section 5.2.2.4.2 of the 3GPP WG2 technical specification, TS25.304 V.3.0.0 (1999-10):

$S_n > 0$ $Qn > Qs + Qoffset_{s,n} + Qhyst$

The inter-frequency cell reselection evaluation uses the same criteria as intra-frequency cell reselections.

The cell selection value, S, is defined in Section 5.2.2.1.2 of the 3GPP WG2 technical specification, TS25.304 V.3.0.0 (1999-10) as:

$S = Q - Qmin - Pcompensation$.

Changes were proposed to the 3GPP WG2 technical specification to provide new parameters in the inter-frequency cell reselection criteria in order to support hierarchical cell structures, with two cell layers, in the UE idle mode, and for cell selection and reselection in the connected mode (Change Request number 5 made to 25.304 version 3.0.0 (Ericsson), published Nov. 29,–Dec. 3, 1999 in 3GPP TSG-RAN WG2 Meeting #9 in Sophia Antipolis, France, and Change Request number 2 r1 made to 25.304 version 3.0.0 (Ericsson), published Nov. 29–Dec. 3, 1999 in 3GPP TSG-RAN WG2 Meeting #9 in Sophia Antipolis, France, respectively. The disclosures of each of these Change Request documents is incorporated by reference herein in its entirety.)

Also in the Change Request number 5 an optional Qhcs parameter is proposed for giving the operator an absolute threshold for controlling the cell radius of a micro-cell.

The inventors have realized that problems exist in the currently proposed techniques for providing a hierarchical cell structure, specifically with regard to the cell reselection procedures.

OBJECTS AND ADVANTAGES OF THE INVENTION

It is an object and advantage of this invention to provide an improved cell reselection procedure for use in a cellular communications network.

It is another object and advantage of this invention to provide an improved cell reselection procedure for use in a cellular communications network having a hierarchical cell structure.

It is another object and advantage of this invention to provide an improved cell reselection procedure for use in a hierarchical cell structure that is biased to cause the user equipment to reselect to smaller cells that are higher in the hierarchy, and wherein a speed of the user equipment is a consideration that can cause the user equipment to perform a reselection to a larger cell, as opposed to a smaller cell.

SUMMARY OF THE INVENTION

The foregoing and other problems are overcome and the objects and advantages of the invention are realized by methods and apparatus in accordance with embodiments of this invention.

In one aspect this invention provides a method for performing a cell reselection in a system comprised of a hierarchy of cells, wherein cells of one layer of the hierarchy have a size that differs from cells of another layer of the hierarchy. The method includes steps of (a) identifying to a user equipment a layer to which individual cells in a neighbor cell list are associated; (b) when performing neighbor cell measurements for reselection purposes, avoiding a measurement of cells in the list that are larger than a current serving cell unless a Cell Selection (S) parameter falls below a search threshold parameter (Ssearch), and is greater than zero; and (c), if S is less than or equal to zero, and no cell reselection to a better cell is in process, beginning a measurement of neighbor cells without regard for their hierarchical level.

If the user equipment has made cell reselection to N different cells on the same hierarchical layer within a time Tmax, the user equipment initiates a reselection procedure for larger neighbor cells. This procedure accommodates user equipment that is moving at a relatively high speed through the cells. If the user equipment locates a larger cell, which fulfills cell reselection criteria $Sn>0$ and $Qn>Qs+Qoffset_{s,n}+Qhyst$ for time Treselection, cell reselection to the larger cell is made. Furthermore, if the user equipment performs a cell reselection to the larger cell, the user equipment does not attempt to reselect to a smaller cell within a time X, unless an immediate cell evaluation is triggered, wherein the time X can be pre-specified, or can be set by the network.

BRIEF DESCRIPTION OF THE DRAWINGS

The above set forth and other features of the invention are made more apparent in the ensuing Detailed Description of the Invention when read in conjunction with the attached Drawing, wherein.

DETAILED DESCRIPTION OF THE INVENTION

Figure 1:
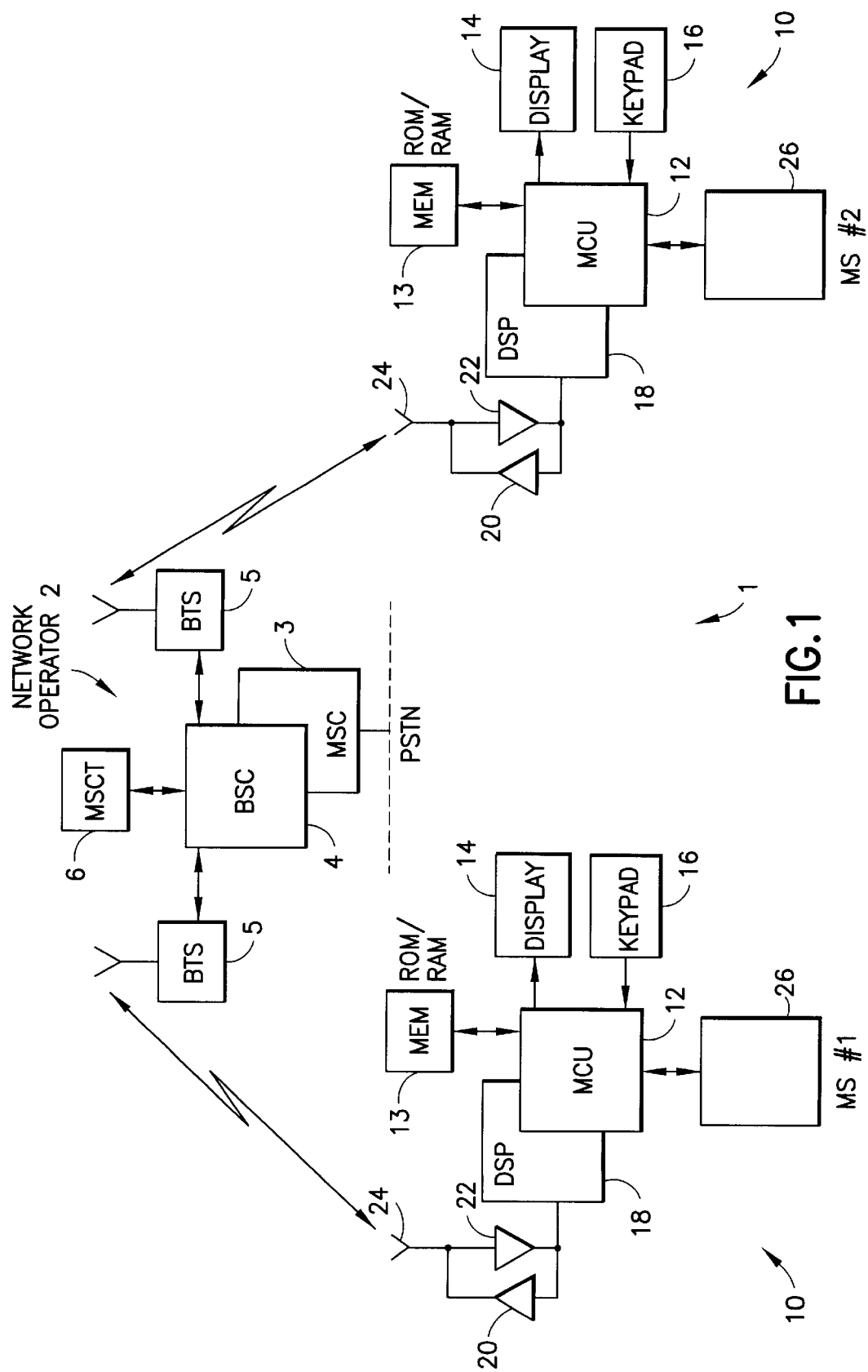
FIG. 1 is a block diagram of a wireless communications system that is suitable for practicing this invention.

Referring to FIG. 1, there is illustrated a simplified block diagram of an embodiment of an exemplary wireless telecommunications system 1 that includes a plurality of mobile terminals or stations 10, also referred to herein as User Equipment (UE). Two mobile stations (MSs) are shown in the Figure, with one being designated MS#1 and the other MS#2. FIG. 1 also shows an exemplary network operator 2 having, for example, a mobile switching center (MSC) 3 for connecting to a telecommunications network, such as the Public Switched Telephone Network or PSTN, at least one base station controller (BSC) 4, and a plurality of base transceiver stations (BTS) 5 that transmit in a forward or downlink direction both physical and logical channels to the mobile stations 10 in accordance with a predetermined air interface standard. It is assumed that a reverse or uplink communication path exists from the mobile station 10 to the network operator, which conveys mobile originated access requests and traffic, as well as signaling for implementing the teachings of this invention. The BTSs 5 define cells, which can be different sizes, different frequencies and so forth as described below.

The air interface standard may conform to a Time Division Multiple Access (TDMA) air interface, and the network may be an UMTS network or other type of network.

However, the teachings of this invention apply equally to Code Division Multiple Access (CDMA) networks, as well as to other network types.

The network operator 2 can include a Message Service Center (MSCT) 6 that receives and forwards messages for the mobile stations 10, such as Short Message Service (SMS) messages, or any wireless messaging technique including e-mail and Supplementary Data Services. Furthermore, enhancements to SMS can be used, such as one under development and known as Multimedia Messaging Service (MMS), wherein image messages, video messages, audio messages, text messages, executables and the like, and combinations thereof, can be transferred between a network and a mobile station.

The mobile station or UE 10 typically includes a microcontrol unit (MCU) 12 having an output coupled to an input of a display 14 and an input coupled to an output of a keyboard or keypad 16. The mobile station 10 may be considered to be a handheld radiotelephone, such as a cellular telephone or a personal communicator, and may have a microphone and a speaker (not shown) for conducting voice communications. The mobile station 10 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 12 is assumed to include or be coupled to some type of a memory 13, including a read-only memory (ROM) for storing an operating program, as well as a random access memory (RAM) for temporarily storing required data, scratchpad memory, received data packets and data packets prepared for transmission, etc. The memory 13 is assumed to store the various parameters that are discussed below in the context of this invention, which are used by the UE 10 for performing cell reselection.

A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 12 to execute the software routines required to operate in accordance with the presently preferred embodiments of these teachings.

The mobile station 10 also contains a wireless section that includes a digital signal processor (DSP) 18, or equivalent high speed processor, as well as a wireless transceiver comprised of a transmitter 20 and a receiver 22, both of which are coupled to an antenna 24 for communication with the network operator 1. The receiver 22 is used for making signal measurements used in the cell reselection process, as will be described in further detail below.

Figure 2:
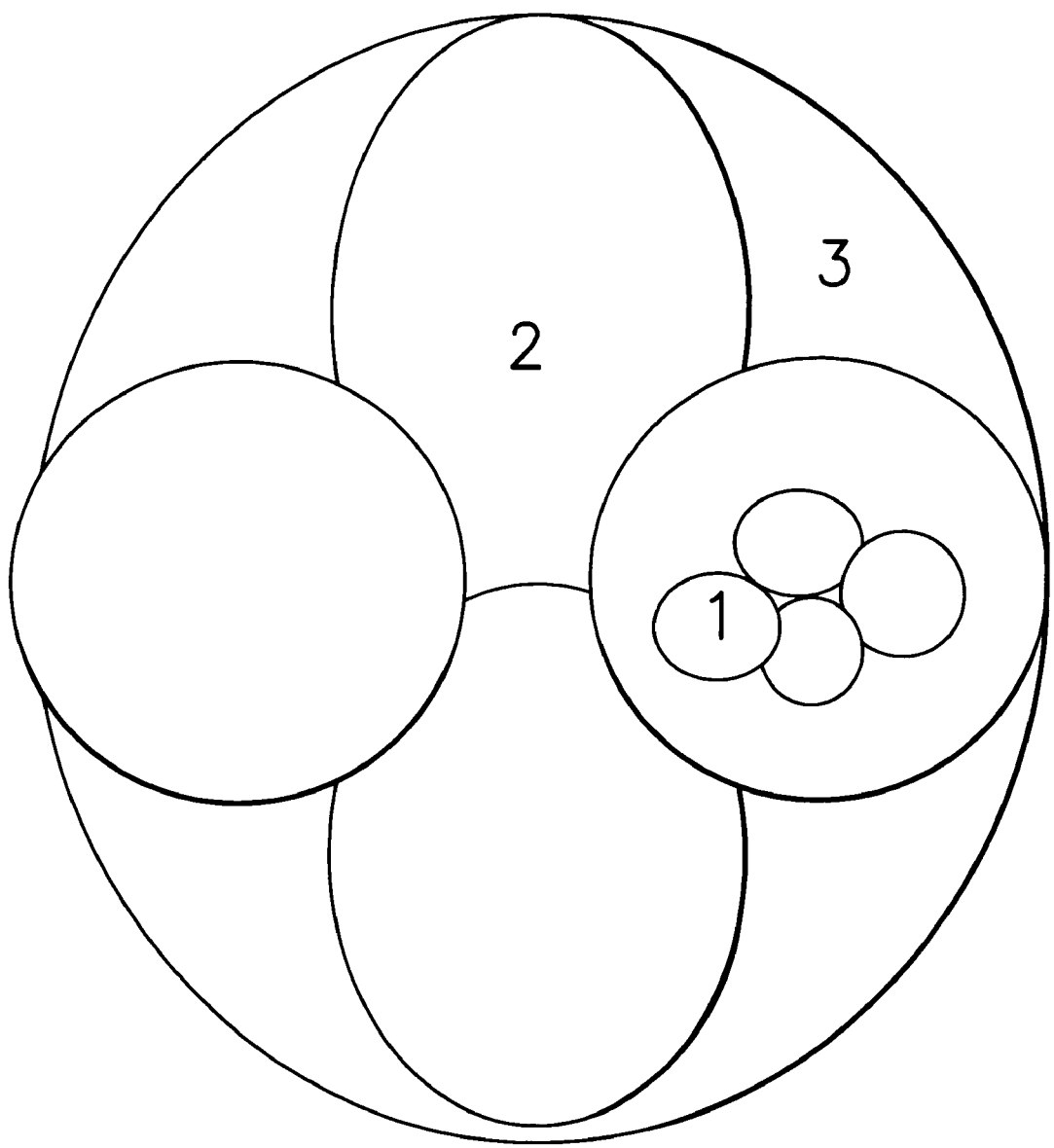
FIG. 2 is an illustration of an exemplary hierarchical cell structure.

FIG. 2 shows an illustrative hierarchical cell structure, where the numbers indicate different levels in the hierarchy.

The highest hierarchical level, typically the smallest cell, is designated as number one. The different layers are typically created using different frequencies, although different frequencies can also be used on the same hierarchical layer, for example to accommodate heavy loading. Although three layers are shown in FIG. 2, more or less than three levels can exist. The teachings of this invention apply to any hierarchical cell structure have two or more layers.

From the network 2 point of view it is desirable to move UEs 10 to smaller cells, i.e., from lower layers to higher layers, or from macro to micro cells, etc. This is desirable if the loading of the smaller cells is not excessive, and if the speed of the UE 10 is not too high. Cell reselection to a highly loaded call can be prevented by setting a suitable value to the reselection offset parameters $Qoffset_{s,n}$. These parameters are preferably set by the network 2.

In order to optimize the cell reselection procedure in the network 2, where there are several frequencies in use, it is one preferred feature to indicate, in the neighbor cell list of the measurement control information of the serving cell, which hierarchical layer each neighbor cell belongs to. By providing this information, it then becomes possible to make rules for the efficient measurement and cell reselection between layers (and different frequencies.)

Inter-frequency Measurement and Cell Reselection Rules

First consider a case where the UE 10 speed is not too high (the high speed case is discussed later).

(A) Whenever in the neighbor cell list of the serving cell there is any neighbor cell belonging to the higher level in the hierarchy (i.e., having a layer number<the layer number of the current serving cell), the UE 10 detects and measures the smaller cells.
When the cell reselection criteria $S_n>0$, and $Q_n>Q_s+Qoffset_{s,n}+Qhyst$ are fulfilled within timer Treselection, the UE 10 makes the cell reselection. Cells on the same hierarchical level, whether on the same frequency or on a different frequency, are also measured in order to guarantee that the UE 10 does not lose coverage. However, cells that are larger than the current serving cell (on a lower layer) are not measured/detected unless the next condition is fulfilled.

(B) When the current serving cell has neighbors which are larger than the current serving cell (i.e., having a layer number>the layer number of the current serving cell), those neighbors are not measured until the parameter S (refer again to Section 5.2.2.1.2 of the 3GPP WG2 technical specification, TS25.304 V.3.0.0 (1999-10)) of the current serving cell is less than a threshold Ssearch (0<S<Ssearch).

Ssearch is a new parameter in accordance with an aspect of this invention, and is preferably set by the network 2. The parameter S defines which cells the UE 10 can access. For this purpose the parameter S is preferred over the parameter Q, since it takes into account the maximum transmitter power of the UE, and thereby performs a check of whether the UE 10 can still access the cell. This search is stopped when Ssearch is larger than (Ssearch+Shyst). Shyst is a hysteresis parameter that is predefined in the specification, or that is set by the network 2.

(C) Whenever S becomes equal to or less than zero ($S \leq 0$) for the serving cell, and no cell reselection to a better cell with $Sn>0$ and $Qn>Qs+Qoffset_{s,n}+Qhyst$ is in process, inter-frequency immediate cell evaluation for all neighbors on all possible hierarchical layers (according to the neighbor cell list) is made. This means that the UE 10 attempts to detect and measure all neighbors on the neighbor cell list, regardless of which hierarchical layer they are associated with. Next, the cell with the highest quality measure (e.g., $Qn-Qoffset_{s,n}$ or $Qn$) is selected. If the value of S of the measured cells do not fulfil the selection criteria the search can be extended to all possible cells in frequencies indicated by the neighboring cell list. This type of immediate cell evaluation ensures that the UE 10 does not lose network coverage.

It should be noted that this type of immediate cell evaluation would not be initiated prior to RACH, as in the normal immediate cell evaluation described in the 3GPP WG2 technical specification, TS25.304 V.3.0.0 (1999-10).

In order to accommodate UEs traveling at high speed through smaller cells (e.g., through micro or pico cells), two other new parameters may be added to the cell reselection procedure. In this manner those UEs travelling above some speed threshold can be moved to larger cells on lower layers, e.g., to macro cells, and unnecessary cell reselections can be avoided.

Further in this regard, if the UE 10 has made cell reselection to N different cells (so ping-ponging between certain cells is also taken care of) on the same hierarchical layer within time Tmax, the UE 10 initiates a detection/measurement procedure for larger neighbor cells, i.e., cells having a larger layer number that the current layer number of the serving cell. If a larger cell is found, which fulfills the cell reselection criteria $Sn>0$ and $Qn>Qs+Qoffset_{s,n}+Qhyst$ are valid for a period of time Treselection, cell reselection to that (larger) cell is made. When a cell reselection to a cell with a higher layer number is made under these circumstances, the UE 10 does not attempt to reselect to a smaller cell within time X, unless immediate cell evaluation is triggered. The time X can be pre-specified, or it can be set by the network 2.

For the case where the UE 10 does not find a cell with a higher layer number, it continues trying so long as rapid cell reselections are being made (e.g., at least N cell reselections to N different cells within time Tmax). Thysteresis can also be added to this activity so that the search for larger cells is not terminated as soon as the N and Tmax criteria are no longer fulfilled. The Thysteresis parameter can aid in the situation wherein, for example, an automobile is suddenly stopped at a traffic light. The use of Thysteresis implies that when this type of measurement of larger cells has been initiated, it is not terminated unless the cell reselection rate is less than N different cells within time Tmax2=Tmax+Thysteresis.

It should be noted that N, Tmax and Thysteresis are parameterized and given by the network 2, or specified in the standardization within some certain range of values.

Different cells which fulfill the cell reselection criteria $Sn>0$ and $Qn>Qs+Qoffset_{s,n}+Qhyst$ and which are measured based on the rules set out above, are compared to one another with a quality measure, such as $Qn-Qoffset_{s,n}$ or $Qn$. A cell with the greatest quality measure ($Qn-Qoffset_{s,n}$ or $Qn$) is reselected.

It should be noted that the teachings of this invention are not limited for use by a UE 10 in the idle mode, but can be employed as well by the UE 10 when in the connect state.

It can be appreciated that by controlling the measurement and reselection procedure, as described above, the power consumption of the user equipment can be better controlled, leading to longer talk and standby times. Also, the likelihood that the user equipment will miss a page message from the network 2 is reduced, as the amount of user equipment processing is reduced when performing measurement and reselection procedures. Also, by the use of this invention the network operator(s) 2 are better enabled to optimize the configuration of the cellular structure.

While the invention has been particularly shown and described with respect to preferred embodiments thereof, it will be understood by those skilled in the art that changes in form and details may be made therein without departing from the scope and spirit of the invention.

What is claimed is:

1. A method for performing a cell reselection in a system comprised of a hierarchy of cells, wherein cells of one layer of the hierarchy have a size that differs from cells of another layer of the hierarchy, comprising steps of:

identifying to a user equipment a layer to which individual cells in a neighbor cell list are associated;

when performing neighbor cell measurements for reselection purposes, avoiding a measurement of cells in the list that are larger than a current serving cell unless a Cell Selection (S) parameter falls below a search threshold parameter (Ssearch), and is greater than zero; and if S is less than or equal to zero, and no cell reselection to a better cell is in process, beginning a measurement of neighbor cells without regard for their hierarchical level.

2. A method as in claim 1, wherein if the user equipment has made cell reselection to N different cells on the same hierarchical layer within a time Tmax, the user equipment initiates a reselection procedure for larger neighbor cells.

3. A method as in claim 2, wherein if the user equipment locates a larger cell that fulfills cell reselection criteria: Sn>0 and Qn>Qs+Qoffset$_{s,n}$+Qhyst are valid for a period of time Treselection, then cell reselection to the larger cell is made.

4. A method as in claim 3, wherein if the user equipment performs a cell reselection to the larger cell, the user equipment does not attempt to reselect to a smaller cell within time X, unless an immediate cell evaluation is triggered, wherein the time X can be specified by a network specification, or can be set by the network.

5. A method as in claim 1, wherein the cell reselection procedure is performed when the user equipment is in an idle state.

6. A method as in claim 1, wherein the cell reselection procedure is performed when the user equipment is in a connect state.

7. A wireless communication system comprised of a hierarchy of cells, wherein cells of one layer of the hierarchy have a size that differs from cells of another layer of the hierarchy, comprising user equipment for being located within cells of a wireless communication network, said network for identifying to a user equipment a layer to which individual cells in a neighbor cell list are associated, said user equipment being responsive to the identification when performing neighbor cell measurements for reselection purposes for avoiding a measurement of cells in the list that are larger than a current serving cell, unless a Cell Selection (S) parameter falls below a search threshold parameter (Ssearch), and is greater than zero; said user equipment being responsive to a condition that if S is less than or equal to zero, and no cell reselection to a better cell is in process, for beginning a measurement of neighbor cells without regard for their hierarchical level.

8. A system as in claim 7, wherein if the user equipment has made cell reselection to N different cells on the same hierarchical layer within a time Tmax, the user equipment initiates a reselection procedure for larger neighbor cells.

9. A system as in claim 8, wherein if the user equipment locates a larger cell that fulfills cell reselection criteria: Sn>0 and Qn>Qs+Qoffset$_{s,n}$+Qhyst are valid for a period of time Treselection, then cell reselection to the larger cell is made.

10. A system as in claim 9, wherein if the user equipment performs a cell reselection to the larger cell, the user equipment does not attempt to reselect to a smaller cell within time X, unless an immediate cell evaluation is triggered, wherein the time X can be specified by a network specification, or can be set by the network.

11. A system as in claim 7, wherein the cell reselection procedure is performed when the user equipment is in an idle state.

12. A system as in claim 7, wherein the cell reselection procedure is performed when the user equipment is in a connect state.

* * * * *